(12) United States Patent
Han

(10) Patent No.: US 12,626,344 B2
(45) Date of Patent: May 12, 2026

(54) IMAGE PROCESSOR AND IMAGE PROCESSING SYSTEM INCLUDING THE SAME

(71) Applicant: SK hynix Inc., Gyeonggi-do (KR)

(72) Inventor: Ji Hee Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 106 days.

(21) Appl. No.: 18/429,425

(22) Filed: Feb. 1, 2024

(65) Prior Publication Data

US 2025/0078234 A1      Mar. 6, 2025

(30) Foreign Application Priority Data

Aug. 31, 2023      (KR) ........................ 10-2023-0115485

(51) Int. Cl.
| | |
|---|---|
| G06T 7/00 | (2017.01) |
| G06T 7/11 | (2017.01) |
| G06T 7/13 | (2017.01) |
| H04N 25/60 | (2023.01) |

(52) U.S. Cl.
CPC .............. G06T 7/0002 (2013.01); G06T 7/11 (2017.01); G06T 7/13 (2017.01); H04N 25/60 (2023.01); *G06T 2207/30168* (2013.01)

(58) Field of Classification Search
CPC . G06T 7/0002; G06T 7/11; G06T 7/13; G06T 2207/30168; G06T 5/70; G06T 7/0004; G06T 3/4007; G06T 7/136; H04N 25/60; G06V 10/44; G06V 10/776

USPC .......................................................... 348/294
See application file for complete search history.

(56) References Cited

U.S. PATENT DOCUMENTS

| | | | | |
|---|---|---|---|---|
| 2008/0112637 A1* | 5/2008 | Horie | ........................ | G06T 5/20 |
| | | | | 348/E5.079 |
| 2008/0266432 A1* | 10/2008 | Tsuruoka | ............. | H04N 25/134 |
| | | | | 348/E5.064 |
| 2009/0251583 A1* | 10/2009 | Kim | ..................... | H04N 25/628 |
| | | | | 348/241 |
| 2012/0257809 A1* | 10/2012 | Miyamoto | ................ | G06T 7/13 |
| | | | | 382/132 |
| 2012/0314137 A1* | 12/2012 | Numao | ................ | G09G 3/3611 |
| | | | | 348/E5.077 |
| 2015/0181077 A1* | 6/2015 | Misawa | .................. | G06T 7/136 |
| | | | | 358/2.99 |
| 2024/0233089 A1* | 7/2024 | Sawada | ..................... | G06T 7/11 |

FOREIGN PATENT DOCUMENTS

KR      10-2022-0097818 A      7/2022

* cited by examiner

*Primary Examiner* — Lin Ye
*Assistant Examiner* — Chan T Nguyen
(74) *Attorney, Agent, or Firm* — IP & T GROUP LLP

(57) ABSTRACT

Disclosed is an image processor and an image processing system including the same. The image processor includes an analyzer configured to generate quantified characteristic values of noise reflected in a captured image based on image values corresponding to the captured image, and a discriminator configured to determine whether the noise has occurred in the captured image based on the characteristic values.

20 Claims, 4 Drawing Sheets

(A)

(B)

(C)

IMAGE PROCESSOR AND IMAGE PROCESSING SYSTEM INCLUDING THE SAME

CROSS-REFERENCE TO RELATED APPLICATION(S)

This application claims priority under 35 U.S.C. § 119 to Korean Patent Application No. 10-2023-0115485, filed on Aug. 31, 2023, the disclosure of which is incorporated herein by reference in its entirety.

BACKGROUND

1. Field

Various embodiments of the present disclosure relate to a semiconductor design technique, and more particularly, to an image processor and an image processing system including the same.

2. Description of the Related Art

Image sensors are devices for capturing images using the property of a semiconductor which reacts to light. Image sensors may be roughly classified into charge-coupled device (CCD) image sensors and complementary metal-oxide semiconductor (CMOS) image sensors. Recently, CMOS image sensors are widely used because the CMOS image sensors can allow both analog and digital control circuits to be directly implemented on a single integrated circuit (IC).

As the image sensors become more highly integrated and faster, the image sensors become more susceptible to noise, and images captured through the image sensors may deteriorate due to the noise.

SUMMARY

Various embodiments of the present disclosure are directed to an image processor capable of evaluating noise qualitatively and quantitatively, and an image processing system including the image processor.

In accordance with an embodiment of the present disclosure, an image processor may include: an analyzer configured to generate quantified characteristic values of noise reflected in a captured image based on image values corresponding to the captured image; and a discriminator configured to determine whether the noise has occurred in the captured image based on the characteristic values.

In accordance with an embodiment of the present disclosure, an image processing system may include: an image sensor configured to generate image values corresponding to a captured image; and an image processor configured to model noise independent of data components and quantify the noise, based on the image values.

In accordance with an embodiment of the present disclosure, an image processing method may include: generating image values corresponding to a captured image; extracting noise reflected in a captured image based on the image values; extracting edge components from the noise; generating quantified characteristic values of the noise based on the edge components and the image values; and qualitatively and quantitatively evaluating the noise based on the characteristic values.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements but may further include or have the one or more other elements, unless otherwise mentioned. In the description throughout the specification, some components are described in singular forms, but the present disclosure is not limited thereto, and it will be understood that the components may be formed in plural.

Figure 1:
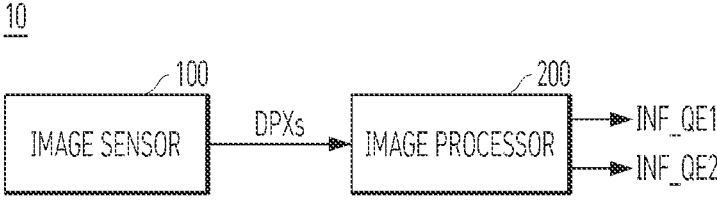
FIG. 1 is a block diagram illustrating an image processing system in accordance with an embodiment of the present disclosure.

FIG. 1 is a block diagram illustrating an image processing system 10 in accordance with an embodiment of the present disclosure.

Referring to FIG. 1, the image processing system 10 may include an image sensor 100 and an image processor 200.

The image sensor 100 may capture an image and generate image values DPXs corresponding to the captured image.

The image processor 200 may estimate noise NO (see FIG. 5), which is reflected (i.e., incorporated) in the captured image, on the basis of the image values DPXs. The noise NO may be a component remaining after excluding a brightness component, i.e., a data component, from image data corresponding to the captured image.

That is, the image processor 200 may estimate the noise NO by removing dependence upon the brightness component from the image data. For example, the noise NO may include horizontal noise, which is a horizontal stripe that appears in the captured image.

The image processor 200 may generate qualitative information INF_QE1 and quantitative information INF_QE2 related to the noise NO. The qualitative information INF_QE1, which is a result of a qualitative evaluation of the noise NO, may be information indicating whether the noise NO is reflected in the captured image. Furthermore, the qualitative information INF_QE1 may indicate strength or weakness of the noise NO reflected in the captured image. The quantitative information INF_QE2, which is a result of a quantitative evaluation of the noise NO, may be information that quantifies the noise NO. More precisely, the quantitative information INF_QE2 may be information that quantifies edge components X and Y of the noise NO. The quantitative information INF_QE2 is described in more detail below (refer to FIG. 9).

Figure 2:
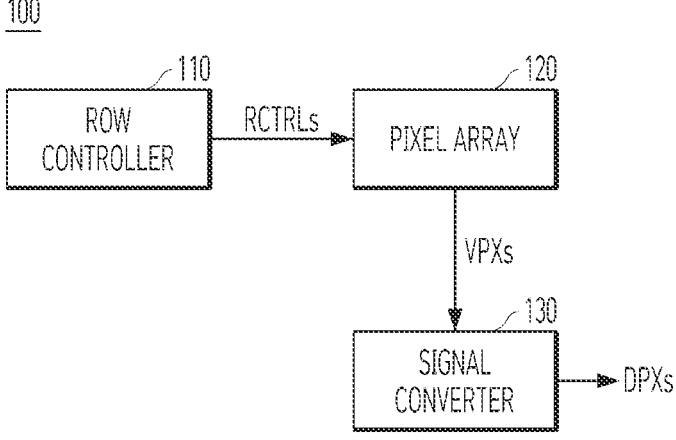
FIG. 2 is a detailed block diagram illustrating an image sensor illustrated in FIG. 1 in accordance with an embodiment of the present disclosure.

FIG. 2 is a detailed block diagram illustrating the image sensor 100 illustrated in FIG. 1 in accordance with an embodiment of the present disclosure.

Referring to FIG. 2, the image sensor 100 may include a row controller 110, a pixel array 120, and a signal converter 130.

The row controller 110 may generate row control signals RCTRLs for controlling the pixel array 120 for each row. For example, the row controller 110 may generate first row control signals for controlling pixels arranged in a first row of the pixel array 120 and generate $y^{th}$ row control signals for controlling pixels arranged in an $y^{th}$ row of the pixel array 120, where "y" is a natural number greater than 1. The first and $y^{th}$ row control signals may be included in the row control signals RCTRLs.

The pixel array 120 may include a plurality of pixels arranged in a row direction and a column direction. The plurality of pixels may be arranged in a quad pattern (refer to FIG. 3). The pixel array 120 may generate pixel values VPXs corresponding to incident light for each row, in response to the row control signals RCTRLs. For example, the pixel array 120 may generate the pixel values VPXs from the pixels arranged in the first row during a first row time and generate the pixel values VPXs from the pixels arranged in the $y^{th}$ row during an $y^{th}$ row time. Each of the pixel values VPXs may be an analog-type pixel value. Each of the pixel values VPXs may be a pixel value synthesized from four neighboring pixels, i.e., 2×2 pixels (refer to FIG. 3).

The signal converter 130 may convert the analog-type pixel values VPXs into the digital-type image values DPXs. For example, the signal converter 130 may include an analog to digital converter.

Figure 3:
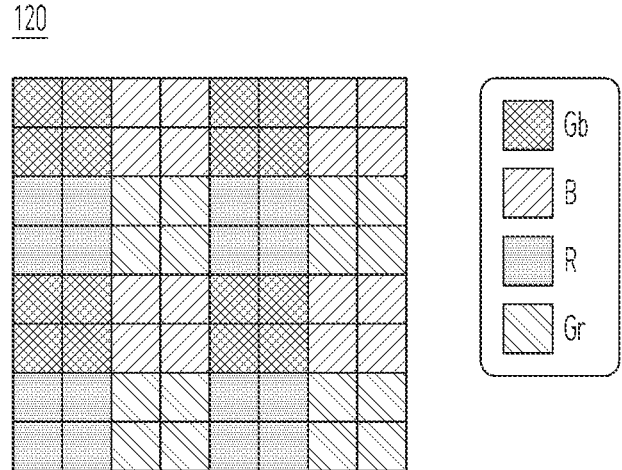
FIG. 3 is a schematic diagram illustrating a pixel array illustrated in FIG. 2 in accordance with an embodiment of the present disclosure.

FIG. 3 is a detailed block diagram illustrating the pixel array 120 illustrated in FIG. 2 in accordance with an embodiment of the present disclosure.

Referring to FIG. 3, the pixel array 120 may include the plurality of pixels arranged in the quad pattern. The quad pattern may have a structure in which four pixels having the same color filter are arranged in a 2×2 unit and a color arrangement is repeated in a 4×4 unit. The 4×4 unit may correspond to a Bayer pattern.

According to an embodiment, the quad pattern may have a structure in which four pixels having a green color filter Gb are arranged in a 2×2 unit at an upper left position, four pixels having a blue color filter B are arranged in a 2×2 unit at an upper right position, four pixels having a red color filter R are arranged in a 2×2 unit at a lower left position, and four pixels having a green color filter Gr are arranged in a 2×2 unit at a lower right position.

Although the present embodiment describes, as an example, the pixel array 120 arranged in the quad pattern, the present disclosure is not necessarily limited thereto, and may also be applied to pixel arrays arranged in various patterns, for example, the Bayer pattern in a 2×2 unit.

Figure 4:
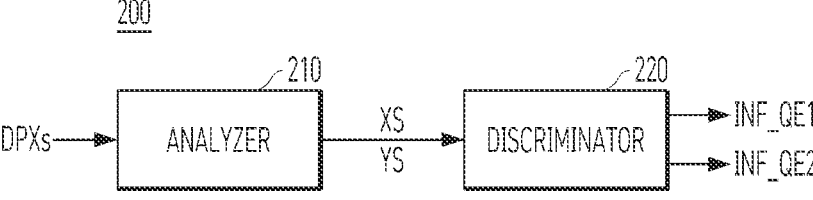
FIG. 4 is a detailed block diagram illustrating an image processor illustrated in FIG. 1 in accordance with an embodiment of the present disclosure.

FIG. 4 is a detailed block diagram illustrating the image processor 200 illustrated in FIG. 1 in accordance with an embodiment of the present disclosure.

Referring to FIG. 4, the image processor 200 may include an analyzer 210 and a discriminator 220.

The analyzer 210 may generate quantified first and second characteristic values XS and YS of the noise NO reflected in the captured image, on the basis of the image values DPXs. The first characteristic value XS may include a first gradient score corresponding to a noise component of a vertical direction of the noise NO. The second characteristic value YS may include a second gradient score corresponding to a noise component of a horizontal direction of the noise NO. The analyzer 210 may extract the noise NO by excluding the brightness component from the image values DPXs. The analyzer 210 may analyze the noise NO and generate the first and second characteristic values XS and YS.

The discriminator 220 may generate the qualitative information INF_QE1 and quantitative information INF_QE2 related to the noise NO, on the basis of the first and second characteristic values XS and XY. The discriminator 220 may generate the qualitative information INF_QE1 on the basis of first and second threshold values Y_TH and DIFF_TH that vary according to intensity of a representative value corresponding to the image values DPXs. For example, the representative value may be an average image value AVG of a region of interest ROI, which is to be described later, and the qualitative information INF_QE1 may indicate that the noise NO has been reflected in the captured image when the following two conditions ① and ② are satisfied.

$$YS \geq Y\_TH \qquad\qquad ①$$

$$YS - XS \geq DIFF\_TH \qquad\qquad ②$$

Herein, "YS-XS", which is a third characteristic value, may refer to a third gradient score corresponding to a difference between the first characteristic value XS and the second characteristic value YS.

That is, when the second characteristic value YS is greater than or equal to the first threshold value Y_TH, and the third characteristic value YS-XS is greater than or equal to the second threshold value DIFF_TH, the noise NO may be present in the captured image. For reference, in the present embodiment, the first and second characteristic values XS and YS change according to the brightness component, and thus it is desirable to use the first and second threshold values Y_TH and DIFF_TH that vary according to the representative value.

The quantitative information INF_QE2 may include at least one of the first characteristic value XS, that is, the first gradient score, the second characteristic value YS, that is, the second gradient score, and the third characteristic value YS-XS, that is, the third gradient score.

Figure 5:
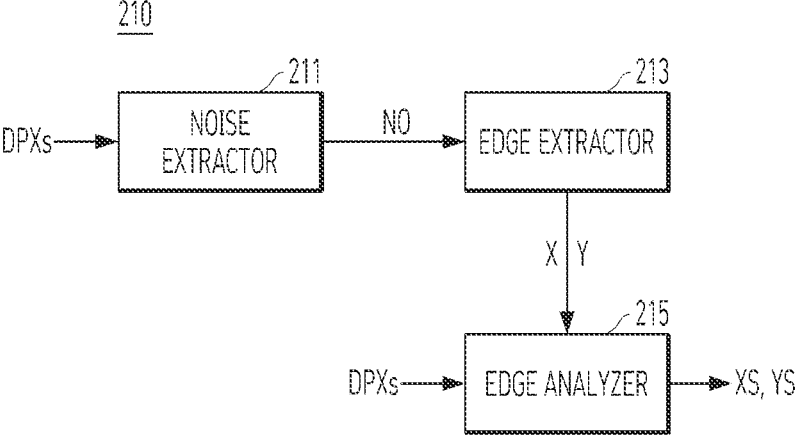
FIG. 5 is a detailed block diagram illustrating an analyzer illustrated in FIG. 4 in accordance with an embodiment of the present disclosure.

FIG. 5 is a detailed block diagram illustrating the analyzer 210 illustrated in FIG. 4 in accordance with an embodiment of the present disclosure.

Referring to FIG. 5, the analyzer 210 may include a noise extractor 211, an edge extractor 213, and an edge analyzer 215.

The noise extractor 211 may extract the noise NO on the basis of the image values DPXs. For example, the noise extractor 211 may model the noise NO by removing the brightness component from the image values DPXs.

The edge extractor 213 may extract the edge components X and Y from the noise NO. The edge components X and Y may be extracted for each pixel. The edge components X and Y may include a first gradient X indicating an amount of edge change in a horizontal direction, and a second gradient Y indicating an amount of edge change in a vertical direction. When the horizontal noise appears in the captured image, the amount of edge change in the horizontal direction, that is, the first gradient X, may be small, and the amount of edge change in the vertical direction, that is, the second gradient Y, may be large. For example, the edge extractor 213 may include a Prewitt filter.

The edge analyzer 215 may generate the first and second characteristic values XS and YS on the basis of the edge components X and Y and the image values DPXs.

Figure 6:
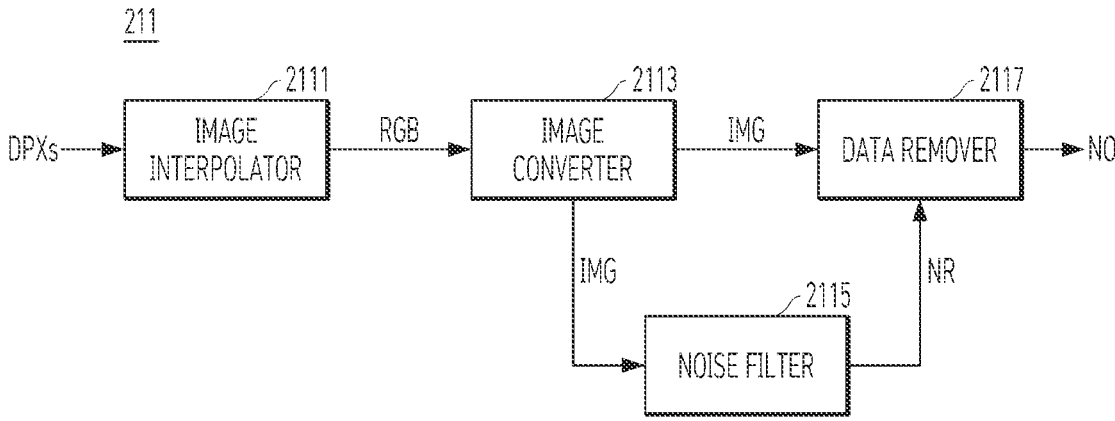
FIG. 6 is a detailed block diagram illustrating a noise extractor illustrated in FIG. 5 in accordance with an embodiment of the present disclosure.

FIG. 6 is a detailed block diagram illustrating the noise extractor 211 illustrated in FIG. 5 in accordance with an embodiment of the present disclosure.

Referring to FIG. 6, the noise extractor 211 may include an image interpolator 2111, an image converter 2113, a noise filter 2115, and a data remover 2117.

The image interpolator 2111 may interpolate the image values DPXs and generate interpolated image values RGB. For example, the image interpolator 2111 may generate the interpolated image values RGB through bi-linear interpolation. The interpolated image values RGB may be more advantageous than the image values DPXs, which are not interpolated, when the noise NO is detected in terms of spatial resolution.

The image converter 2113 may convert the interpolated image values RGB into gray image values IMG.

The noise filter 2115 may filter the gray image values IMG, and generate filtered image values NR, which correspond to the brightness component, by excluding the noise component from the gray image values IMG. For example, the noise filter 2115 may include a box filter or a mean filter.

The data remover 2117 may model the noise NO on the basis of the filtered image values NR and the gray image values IMG. For example, the data remover 2117 may model the noise NO, which remains after the brightness component is removed from the gray image values IMG, by normalizing the image values NR filtered from the gray image values IMG. The data remover 2117 may model (that is, the brightness component+the noise component, or the brightness component*the noise component) the captured image on the basis of the gray image values IMG, and extract only the noise component, which is independent of the brightness component, as the noise NO by applying the filtered image values NR to the modeled image.

Figure 7:
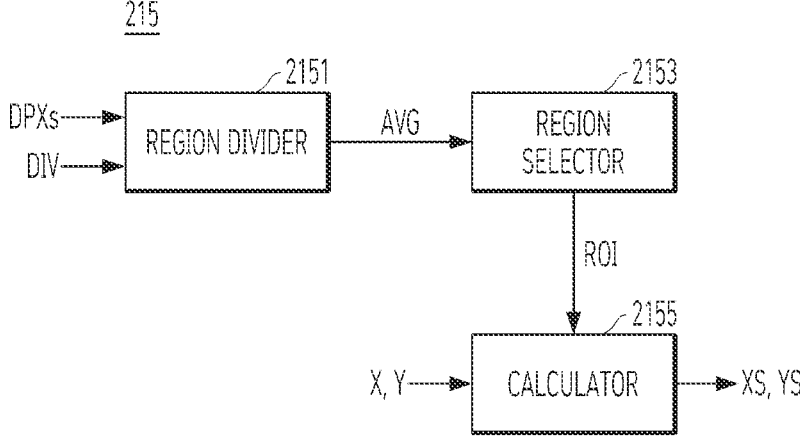
FIG. 7 is a detailed block diagram illustrating an edge analyzer illustrated in FIG. 5 in accordance with an embodiment of the present disclosure.

FIG. 7 is a detailed block diagram illustrating the edge analyzer 215 illustrated in FIG. 5 in accordance with an embodiment of the present disclosure.

Referring to FIG. 7, the edge analyzer 215 may include a region divider 2151, a region selector 2153, and a calculator 2155.

The region divider 2151 may define the captured image as one region or divide the captured image into at least two regions, in response to a division signal DIV. For example, the region divider 2151 may define the entire captured image as one region according to a global index or divide the entire captured image into two or more regions according to a local index. The region divider 2151 may generate at least one average image value AVG, which corresponds to the at least one region, on the basis of the image values DPXs. For example, the average image value AVG may be an average value of image values corresponding to the pixels having the green color filters Gb and Gr in the corresponding region among the image values DPXs.

The region selector 2153 may select a region of interest ROI from the one region or the at least two regions on the basis of the at least one average image value AVG. For example, the region selector 2153 may select a region having an average image value AVG closest to a predetermined noise code value among the at least one region as the region of interest ROI. The predetermined noise code value may be a code value in which the noise NO, that is, the horizontal noise, appears most prominently.

The calculator 2155 may calculate the first and second characteristic values XS and YS corresponding to the region of interest ROI on the basis of the edge components X and Y. For example, the calculator 2155 may calculate the first characteristic value XS on the basis of the following "Equation 1" and calculate the second characteristic value YS on the basis of the following "Equation 2".

$$XS = SCALE * MEAN(|X| @ROI) \qquad \text{[Equation 1]}$$

$$YS = SCALE * MEAN(|Y| @ROI) \qquad \text{[Equation 2]}$$

Herein, "SCALE" may refer to a predetermined constant number, "MEAN(|X| @ROI)" may refer to an average value of the first gradients X included in the region of interest ROI, and "MEAN(|Y| @ROI)" may refer to an average value of the second gradients Y included in the region of interest ROI.

That is, the calculator 2155 may calculate the first characteristic value XS by multiplying the average value of the first gradients X included in the region of interest ROI by the predetermined constant number SCALE and calculate the second characteristic value YS by multiplying the average value of the second gradients Y included in the region of interest ROI by the predetermined constant number SCALE.

Hereinafter, an operation of the image processing system 10 in accordance with an embodiment of the present disclosure, which has the above-described configuration, is described with reference to FIGS. 8 and 9.

Figure 8:
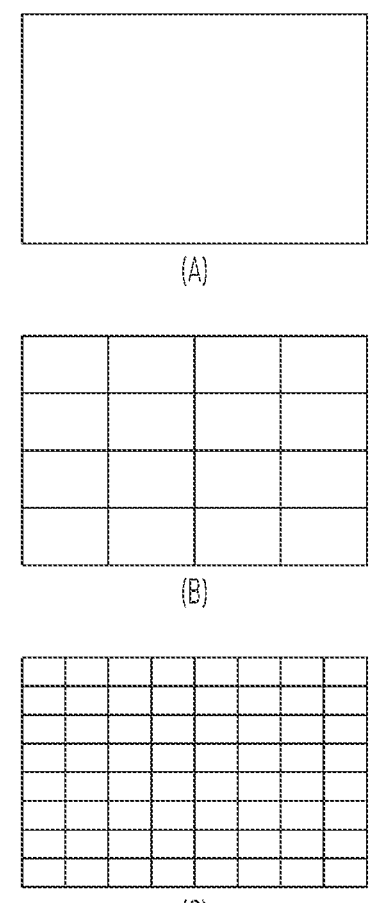
FIGS. 8 and 9 are schematic diagrams for describing an operation of the image processing system in accordance with an embodiment of the present disclosure.

FIG. 8 is a schematic diagram illustrating the process of dividing the captured image into at least two regions in accordance with an embodiment of the present disclosure.

Referring to FIG. 8, the region divider 2151 may define the captured image as one region or divide the captured image into at least two regions, according to a predetermined index in response to the division signal DIV. The at least two regions may be divided into an "N×N" unit, where "N" is a natural number greater than 1.

According to one example, when "N" is set to "1" (N=1), the region divider 2151 may define the captured image as one region according to the global index. As illustrated in (A) of FIG. 8, the entire captured image may be defined as one global region.

According to another example, when "N" is set to "2" or more (N≥2), the region divider 2151 may divide the captured image into two or more regions according to the local index. As illustrated in (B) of FIG. 8, the captured image may be divided into 16 local regions (i.e., N=4). As illustrated in (C) of FIG. 8, the captured image may be divided into 64 local regions (i.e., N=8).

Hereinafter, for convenience in description, the case of "N=4" is used as an example.

The image sensor 100 may capture a scene having a specific color, for example, white, and generate image values DPXs corresponding to the captured image. For example, the image sensor 100 may generate the image values DPXs corresponding to the Bayer pattern from the pixel array 120 arranged in the quad pattern. For example, the image values DPXs may each correspond to a composite value of pixel values generated from four neighboring pixels, that is, 2×2 pixels having the same color filter.

The image processor 200 may generate qualitative information INF_QE1 and quantitative information INF_QE2 related to noise NO reflected in the captured image, on the basis of the image values DPXs. For example, the analyzer 210 may analyze the noise NO reflected in the captured image on the basis of the image values DPXs and generate a first characteristic value XS corresponding to a first gradient score and a second characteristic value YS corresponding to a second gradient score. The discriminator 220 may generate a third characteristic value YS-XS on the basis of the first and second characteristic values XS and YS, and generate the qualitative information INF_QE1 on the basis of the second and third characteristic values YS and YS-XS and first and second threshold values Y_TH and DIFF_TH. The third characteristic value YS-XS may correspond to a third gradient score indicating a difference between the first characteristic value XS and the second characteristic value YS. The first and second threshold values Y_TH and DIFF_TH may each vary according to an intensity of a representative value corresponding to the image values DPXs. The representative value may be an average image value AVG of a region of interest ROI.

The qualitative information INF_QE1 may be information indicating whether the noise NO has occurred in the captured image. For example, the noise NO may include the horizontal noise. The horizontal noise increases as the second gradient score increases and increases as the third gradient score increases. The quantitative information INF_QE2 may be information that quantifies edge components X and Y of the noise NO. For example, the quantitative information INF_QE2 may include the first gradient score, the second gradient score, and the third gradient score.

Figure 9:
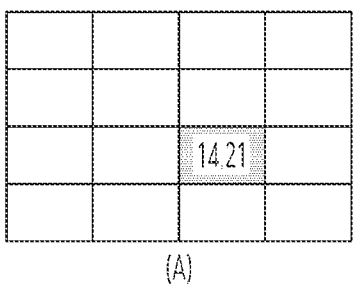
Figure 9:
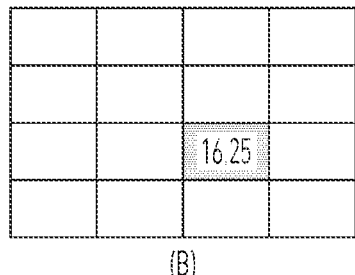
Figure 9:
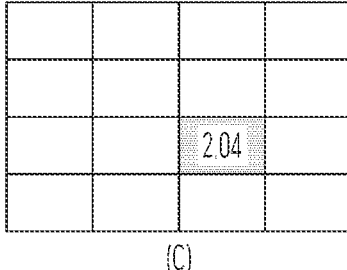

FIG. 9 is a schematic diagram illustrating the quantitative information INF_QE2 in accordance with an embodiment of the present disclosure.

Referring to FIG. 9, for example, the analyzer 210 may extract the noise NO excluding the brightness component from the image values DPXs. The analyzer 210 may analyze the noise NO and generate the first and second characteristic values XS and YS corresponding to the first and second gradient scores. The discriminator 220 may generate the third characteristic value YS-XS corresponding to the third gradient score, on the basis of the first and second characteristic values XS and XY.

As illustrated in (A) of FIG. 9, the discriminator 220 may select the region of interest ROI, that is, a shaded region, from 16 local regions in the captured image, and calculate the first gradient score, that is, the first characteristic value XS, corresponding to the region of interest ROI (refer to "Equation 1" above).

As illustrated in (B) of FIG. 9, the discriminator 220 may calculate the second gradient score, that is, the second characteristic value YS, corresponding to the region of interest ROI, that is, a shaded region, from the 16 local regions in the captured image (refer to "Equation 2" above).

As illustrated in (C) of FIG. 9, the discriminator 220 may calculate the third gradient score, that is, the third characteristic value YS-XS, corresponding to the region of interest ROI, that is, a shaded region, from the 16 local regions in the captured image. The third gradient score may correspond to a difference between the first and second gradient scores.

According to an embodiment of the present disclosure, noise may be extracted from a captured image, and qualitative and quantitative evaluations may be performed on the basis of edge components of the extracted noise.

According to an embodiment of the present disclosure, noise may be evaluated qualitatively and quantitatively, which makes it possible to help to develop an image sensor and/or an image processor.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image processor comprising:
an analyzer configured to generate quantified characteristic values of noise reflected in a captured image based on image values corresponding to the captured image; and
a discriminator configured to determine whether the noise has occurred in the captured image based on the characteristic values,
wherein the analyzer includes:
a noise extractor configured to extract the noise based on the image values;
an edge extractor configured to extract edge components from the noise; and
an edge analyzer configured to generate the characteristic values based on the edge components and the image values.

2. The image processor of claim 1, wherein the analyzer is configured to extract the noise by excluding data components from the image values, and generate the characteristic values based on the noise.

3. The image processor of claim 1, wherein the discriminator is configured to generate another characteristic values based on threshold values that vary according to intensity of a value corresponding to the image values.

4. The image processor of claim 1, wherein the noise extractor includes:
an image interpolator configured to interpolate the image values;
an image converter configured to convert the interpolated image values into gray image values;
a noise filter configured to filter the gray image values, and generate filtered image values corresponding to data components by excluding noise components from the gray image values; and
a data remover configured to remove the data components from the gray image values based on the filtered image values and the gray image values.

5. The image processor of claim 4, wherein the data remover is configured to model the noise remaining after the data components are removed from the gray image values, by normalizing the filtered image values.

6. The image processor of claim 1, wherein the edge analyzer includes:

a region divider configured to define the captured image as one region or divide the captured image into at least two regions, and generate at least one average image value of the at least one region, based on the image values;

a region selector configured to select a region of interest from the one region or the at least two regions based on the at least one average image value; and a calculator configured to calculate the characteristic values corresponding to the region of interest based on the edge components.

7. The image processor of claim 6, wherein the calculator is configured to calculate the characteristic values by multiplying the edge components by a predetermined constant number.

8. The image processor of claim 1, wherein the characteristic values include a first gradient score corresponding to a noise component of a vertical direction, a second gradient score corresponding to a noise component of a horizontal direction, and a third gradient score corresponding to a difference between the first gradient score and the second gradient score.

9. An image processing system comprising:

an image sensor configured to generate image values corresponding to a captured image; and an image processor configured to model noise independent of data components and quantify the noise, based on the image values, wherein the image processor includes:

an analyzer configured to generate quantified characteristic values of the noise reflected in the captured image based on the image values; and a discriminator configured to qualitatively and quantitatively evaluate the noise based on the characteristic values, and wherein the analyzer includes:

a noise extractor configured to extract the noise based on the image values;

an edge extractor configured to extract edge components from the noise; and an edge analyzer configured to generate the characteristic values based on the edge components and the image values.

10. The image processing system of claim 9, wherein the image processor is configured to quantify edge components of the noise.

11. The image processing system of claim 9, wherein the analyzer is configured to extract the noise by excluding the data components from the image values and generate the characteristic values based on the noise.

12. The image processing system of claim 9, wherein the discriminator is configured to generate another characteristic value based on threshold values that vary according to intensity of a value corresponding to the image values.

13. The image processing system of claim 9, wherein the noise extractor includes:

an image interpolator configured to interpolate the image values;

an image converter configured to convert the interpolated image values into gray image values;

a noise filter configured to filter the gray image values, and generate filtered image values corresponding to data components excluding noise components from the gray image values; and a data remover configured to remove the data components from the gray image values based on the filtered image values and the gray image values.

14. The image processing system of claim 13, wherein the data remover is configured to model the noise remaining after the data components are removed from the gray image values, by normalizing the filtered image values.

15. The image processing system of claim 9, wherein the edge analyzer includes:

a region divider configured to define the captured image as one region or divide the captured image into at least two regions, and generate at least one average image value of the at least one region, based on the image values;

a region selector configured to select a region of interest from the one region or the at least two regions based on the at least one average image value; and a calculator configured to calculate the characteristic values corresponding to the region of interest based on the edge components.

16. The image processing system of claim 15, wherein the calculator is configured to calculate the characteristic values by multiplying the edge components by a predetermined constant number.

17. The image processing system of claim 9, wherein the characteristic values include a first gradient score corresponding to a noise component of a vertical direction, a second gradient score corresponding to a noise component of a horizontal direction, and a third gradient score corresponding to a difference between the first gradient score and the second gradient score.

18. An image processing method comprising:

generating image values corresponding to a captured image;

extracting noise reflected in a captured image based on the image values;

extracting edge components from the noise;

generating quantified characteristic values of the noise based on the edge components and the image values; and qualitatively and quantitatively evaluating the noise based on the characteristic values.

19. The image processing method of claim 18, wherein the extracting of the noise comprises:

interpolating the image values;

converting the interpolated image values into gray image values;

filtering the gray image values;

generating filtered image values corresponding to data components by excluding noise components from the gray image values;

removing the data components from the gray image values based on the filtered image values and the gray image values; and modeling the noise remaining after the data components are removed from the gray image values, by normalizing the filtered image values.

20. The image processing method of claim 18, wherein the generating of the characteristic values comprises:

dividing the captured image into at least two regions and generating at least two average image values of the at least two regions, based on the image values;

selecting a region of interest from the at least two regions based on the at least two average image values; and calculating the characteristic values corresponding to the region of interest based on the edge components.

* * * * *